United States Patent [19]
Franzen et al.

[11] Patent Number: 6,069,194
[45] Date of Patent: May 30, 2000

[54] PACKAGED ASPHALT CONTAINING FUME-REDUCING ADDITIVES AND METHOD OF PRODUCING SAME

[75] Inventors: Michael R. Franzen, Lombard, Ill.; Donn R. Vermilion, Newark, Ohio; David C. Trumbore, LeGrange, Ill.; Richard T. Janicki, Oaklawn, Ill.; Jeffrey W. Smith, Bolingbrook, Ill.; Jay W. Keating, Tinley Park, Ill.; Jorge A. Marzari, Darien, Ill.; Thomas C. Bitsky, Lemont, Ill.; Ron S. Bliss, Lockport, Ill.

[73] Assignee: Owens Corning Fiberglass Technology, Inc., Summit, Ill.

[21] Appl. No.: 08/990,012

[22] Filed: Dec. 12, 1997

[51] Int. Cl.[7] .................................................. C08L 95/00
[52] U.S. Cl. ................................ 524/69; 524/59; 524/68; 524/70; 524/71
[58] Field of Search .................................. 524/59, 68, 69, 524/70, 71

[56] References Cited

U.S. PATENT DOCUMENTS

| | | | |
|---|---|---|---|
| 3,307,739 | 3/1967 | Cloyd et al. | 206/508 |
| 3,521,788 | 7/1970 | Kandel et al. | 220/675 |
| 3,759,416 | 9/1973 | Constantine | 206/505 |
| 3,854,582 | 12/1974 | Martinelli | 206/508 |
| 4,512,493 | 4/1985 | Von Holdt | 220/782 |
| 4,550,849 | 11/1985 | Adsit | 220/71 |
| 4,848,580 | 7/1989 | Wise | 206/519 |
| 5,083,674 | 1/1992 | Clark | 220/4.27 |
| 5,290,833 | 3/1994 | Schmanski | 524/71 |
| 5,733,616 | 3/1998 | Janicki et al. | 428/489 |

FOREIGN PATENT DOCUMENTS

| | | |
|---|---|---|
| 1145924 | 3/1966 | United Kingdom . |
| 1379246 | 3/1972 | United Kingdom . |

*Primary Examiner*—Peter A. Szekely
*Attorney, Agent, or Firm*—Inger H. Eckert; James J. Dottavio

[57] ABSTRACT

A method and apparatus for packaging a low-fuming meltable asphalt composition which includes the introduction of pellets comprising one or more polymeric materials into molten asphalt flowed into a conventional container or carton.

13 Claims, 1 Drawing Sheet

PACKAGED ASPHALT CONTAINING FUME-REDUCING ADDITIVES AND METHOD OF PRODUCING SAME

TECHNICAL FIELD AND INDUSTRIAL APPLICABILITY OF THE INVENTION

This invention relates in general to low-fuming asphalt materials for use in roofing and other applications. More particularly, this invention relates to the incorporation of polymer particles or structures, or polymer and asphalt composite particles or structures, in asphalt contained in conventional metal and paper packages to reduce the fumes from melting kettles when the asphalt is remelted by an end user for application in its product or process. The invention can be useful for providing packages of asphalt for applications ranging from built-up roofing systems to paving, in locations where fumes from the kettle are a concern.

BACKGROUND OF THE INVENTION

Asphalt from asphalt processing and terminalling facilities is transported to end users in one of several ways, including direct piping of molten asphalt to nearby customers, shipping in liquid form via tanker truck and railcar, and shipping in solid form in individual packages. The individual packages are used primarily by building contractors as a source of asphalt for roofing applications, and are typically formed by pouring molten asphalt into containers made of a metal bottom and cylindrical paper sidewalls. The asphalt is typically poured at temperatures of about 177° C., and the packages are allowed to cool for up to 24 hours prior to shipping. After removing the paper and metal container, which become waste, the end user typically places the solid asphalt in a gas-fired melting kettle to melt the asphalt for use.

A problem associated with such heated kettles of molten asphalt is that they can emit significant amounts of fumes. The fumes can be unsightly, and an irritant to workers and others in the surrounding area. Accordingly, efforts have been taken to reduce the amount of fumes emitted from such kettles. In this regard, it has been discovered that the introduction of polymeric materials that rise to the surface of the molten asphalt in the kettle and form a skim coating thereon reduces fuming. While the polymeric material can generally be added to the asphalt in the kettle in almost any manner to reduce fuming, adding the polymer in the asphalt packages supplied to the end user provides continual replenishment of the polymer in the melting kettle, and is by far the most convenient form of accomplishing the desired result. However, while such polymers have previously been included in such packages in the form of a consumable container for the asphalt, e.g., Owens Corning's TruMelt® containers, it has been discovered that incorporating such polymers in traditional metal and paper asphalt packages is less than straightforward. In particular, it has been found that the introduction of polymer into the packages prior to filling the package with molten asphalt often results in the polymer migrating to the top and sides of the package rather than becoming embedded in the asphalt. As a result, when the packaging materials are removed from the solidified asphalt at the construction site, a significant amount of the polymer particles separate from the asphalt and are thrown away with the packaging materials.

Accordingly, a need exists for a method of introducing the desired polymer into the asphalt contained in standard metal and paper packaging in a manner that the polymer is integrally bonded to the solidified asphalt contained in the package (hereinafter referred to as "packaged asphalt") such that it does not separate therefrom when the packaging materials are stripped from the asphalt and thrown away at the construction site. These needs are met by the process of the invention disclosed below.

SUMMARY OF THE INVENTION

The present invention provides an effective way to reduce the fumes normally produced when conventional packages of asphalt are melted in a heated kettle for use at a construction site. In accordance with the invention, from about 0.2 to about 6.0 percent by weight of a polymeric material is added to the packaged asphalt to reduce the fumes from the kettle. Upon introduction of the packaged asphalt into the kettle, the asphalt and polymer melt, and the molten polymer floats to the surface thereby forming a skim, skin, or film across substantially the entire upper surface of the molten asphalt that reduces the fumes emanating from the kettle. Although the molten polymer eventually dissolves in the bulk asphalt, the skim is continually renewed as packages of asphalt are cycled through the kettle.

The present invention thus provides a method and apparatus for introducing polymeric materials into conventional asphalt packages in a manner that the polymer is integrally bonded to the packaged asphalt such that it does not separate from the asphalt during removal of the packaging materials, yet will separate from the asphalt upon melting in a kettle and float to the surface to form a fume-reducing film layer. The polymer may be added to the asphalt neat, such as in the form of powders, granules, pellets, or other molded shapes (hereinafter collectively referred to as "pellets"), but is preferably introduced into the packaged asphalt in the form of a solidified mixture of molten polymer and asphalt, such as coextruded pellets. Such composite pellets typically provide better reductions in hydrocarbon emissions than skims resulting from the melting of pure polymer, and the presence of the asphalt in the pellets aids their melting and increases the dispersability of the polymer. Additionally, if desired, a polyolefin film liner (e.g., polypropylene) may also be placed inside the package prior to the introduction of the asphalt to provide additional polymer and help prevent the pellets from sticking to the container upon solidification of the asphalt.

In the process of the invention, the polymer or polymer/asphalt pellets are combined with molten asphalt, such that the pellets are covered with molten asphalt, as they enter the package. This may be accomplished by injecting the pellets into a stream of molten asphalt as it is filling the package, or by introducing the asphalt and pellets into the package separately but simultaneously, such that the pellets are thoroughly coated with asphalt as they enter the package. As a result, although the pellets are typically less dense than the molten asphalt and tend to rise to the top of the package, the pellets are enveloped in the asphalt and have a much reduced tendency to separate from the asphalt upon removal of the package. Consequently, the package materials may be stripped from the packaged asphalt and thrown away without significantly reducing the amount of polymer that is added to the melting kettle with the packaged asphalt.

DETAILED DESCRIPTION AND PREFERRED EMBODIMENTS OF THE INVENTION

Figure 1:
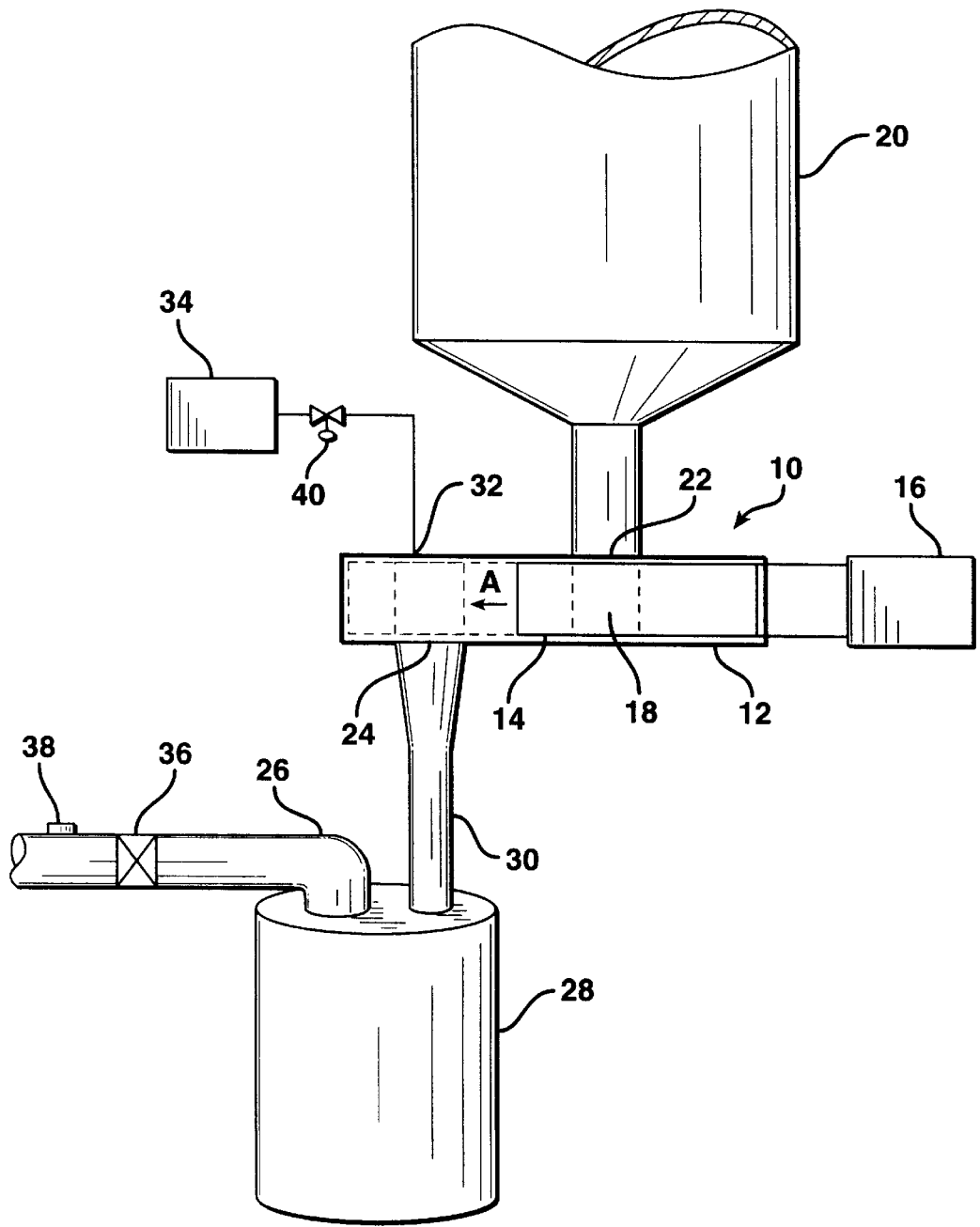
FIG. 1 illustrates an apparatus of the invention useful for introducing polymer pellets, or asphaltpolymer composite pellets, into conventional packages of asphalt.

As discussed above, when asphalt is used in roofing or paving applications, it is usually melted in a gas-fired kettle in preparation for its use. As used herein, the term "kettle" means any container or vessel suitable for holding molten asphalt, such as a roofer's kettle. A problem associated with these heated kettles of conventional molten asphalt is that they can emit significant amounts of fumes. These fumes can be unsightly and an irritant to workers and other people in the surrounding area. Advantageously, it has been found that the incorporation of a minor amount of polymer, or polymer/asphalt composite, pellets in traditional packages of solidified asphalt according to this invention helps to control fuming during melting of the asphalt in a kettle.

When the contents of such packages are heated to a temperature sufficient to melt the asphalt, the added pellets melt along with the asphalt, and some of the polymer contained in the pellets collects on the upper surface of the molten asphalt prior to dissolution to form a skim. The term "skim" means a thin layer or film which floats or forms on the upper surface of the molten asphalt. Preferably, the polymer forms a skim across substantially the entire upper surface of the molten asphalt. It is understood that when additional asphalt is placed into the kettle, the skim may be broken but it usually quickly re-forms over the surface.

While not intending to be limited by theory, it is believed that the skim reduces fuming from the kettle by acting as a cool top or barrier to exposure of the molten asphalt to air. The thickness of the skim is a function of the addition rate of polymer material minus the polymer's dissolution rate. The dissolution rate is a function of fundamental polymer properties as well as kettle temperature and agitation level. The thickness of the skim is usually from about 3 mm to about 13 mm, typically about 6 mm. However, it is believed that a skim thickness of at least about 0.025 mm, more preferably of at least about 0.25 mm, is suitable for reducing fuming from the kettle.

The skim is preferably viscous enough so that it stays together as a continuous layer to reduce fuming from the kettle. If the viscosity of the skim is too low, fumes from the molten asphalt could break up through holes in the skim and escape from the kettle. In contrast, if the viscosity is too high, it will not easily form a continuous skim over the entire exposed surface of the asphalt kettle, nor redisperse or dissolve easily into the bulk asphalt over time. To provide a suitable viscosity, preferably the added polymer has a melt flow index of from about 15 to about 95 grams/10 minutes, more preferably from about 25 to about 85 grams/10 minutes, and even more preferably from about 35 to about 75 grams/10 minutes. A lower melt flow index generally indicates a more viscous polymer. The melt flow index is measured at 190° C. under a 2.16 kg load according to ASTM D1238 Method B.

The inclusion of polymers to form such skims may advantageously be used with any asphalt product that is generally heated in an open kettle in preparation for its use. As used herein the term "asphalt" is meant to include asphalt bottoms from petroleum refineries, as well as naturally occurring bituminous materials such as asphalts, gilsonite, tars, and pitches, or these same materials that have been air-blown or otherwise chemically processed or treated. For example, the asphalt can be air blown with catalysts such as ferric chloride and the like. The asphalt can be a conventional roofing flux asphalt or a paving-grade asphalt, as well as other types of asphalts, including specialty asphalts such as water-proofing asphalts, battery compounds, and sealers. Blends of different kinds of asphalt can also be used.

The polymer material added to the asphalt can be any polymer capable of melting and forming a skim of sufficient viscosity on the upper surface of the molten asphalt to reduce fuming from the kettle. The polymer should have a relative density lower than that of the asphalt so that it rises to the upper surface of a kettle of the molten asphalt, and should be miscible and compatible with the asphalt.

Exemplary polymers that may be used include polyolefin polymers such as polypropylene, ethylene-propylene copolymers, and butylene copolymers; ethylene-vinylacetate copolymers; copolymers of acrylates and methacrylates, such as butyl, propyl, ethyl, or methyl acrylate or methacrylate copolymerized with ethylene, propylene, or butylene; epoxy-functionalized copolymers such as a terpolymer of ethylene, butyl acrylate and glycidyl methacrylate, available from E. I. duPont de Nemours & Co. (Wilmington, Del.) as Elvaloyb AM; and synthetic rubber such as styrene-butadiene-styrene (SBS), styrene-butadiene rubber (SBR), styrene-ethylene-butylene-styrene (SEBS), or terpolymer made from ethylene-propylene diene monomer (EPDM); and mixtures thereof. Preferably, the polymer material is selected from polypropylenes, ethylene-propylene copolymers, ethylene-vinyl acetate copolymers, ethylene-methylacrylate copolymers, synthetic rubbers, and mixtures thereof. Useful ethylene-vinyl acetate copolymers preferably have a vinyl acetate content from about 5% to about 40% by weight, more preferably from about 9% to about 28% by weight, so that they are suitably soluble in the asphalt. Preferred ethylene-vinyl acetate copolymers include the "Elvax" series from duPont, such as Elvax 360 through 750, preferably Elvax 450 or 470. Ethylene-vinyl acetate copolymers are also available from USI Chemicals under the trade names "Ultrathene" and "Vynathene".

Although a wide range of polymeric materials are useful in the invention, the polymer selected for use with a particular asphalt should not undesirably modify the properties of the asphalt in the amount added. For example, where the packaged asphalt is intended to be used as a roofing asphalt, it is preferred that both the asphalt without (before addition of) the polymer, and with the polymer, meets the requirements for at least one type of roofing asphalt according to ASTM D312, more particularly ASTM D312-89. Accordingly, it is preferred that the addition of the polymer to the asphalt reduces fuming but does not significantly change the properties of the asphalt. More preferably, the asphalt with the added polymer meets the following ASTM D312 specifications for a Type III roofing asphalt: softening point (by ASTM D36) of 85–96° C.; flash point of 246° C. minimum; penetration (by ASTM D5) at 0° C. of 6 dmm minimum, at 25° C. of 15–35 dmm, and at 46° C. of 90 dmm maximum; ductility (by ASTM D-113) at 25° C. of 2.5 cm minimum; and solubility (by ASTM D2042) in trichloroethylene of at least 99%. Preferably the addition of the polymer to the asphalt does not change the softening point of the asphalt by more than about 9° C., more preferably not more than about 3° C., and does not change the penetration of the asphalt by more than about 10 dmm at 25° C.

Further, in some instances, the polymer chosen for use with a particular asphalt, and the amount added, may be selected to enhance the physical properties of the resulting composition. For example, the polymeric material selected for use with cold-flowable paving asphalts may advantageously be selected to enhance the properties of such asphalts, such as their high-temperature performance as measured by, e.g., the Federal Highway Association's pending Strategic Highway Research Program (SHRP) specification. Exemplary polymers for improving asphalt paving properties include ethylene-vinylacetate copolymers, styrene-butadine-styrene rubber, polypropylene, and ethylene-methylacrylate copolymers.

The polymer is preferably added to the package as a solid asphalt/polymer composite pellet, as such pellets have been found to provide superior abatement of hydrocarbon emissions in comparison to the independent addition of solid polymer, and the presence of the asphalt helps facilitate melting of the pellets and dispersion of the polymer. However, if desired, polymer may also be added in the form of neat pellets or a polyolefin film liner placed in the package prior to filling with asphalt, which helps keep the asphalt from sticking to the packaging materials. Suitable composite pellets may contain from about 30% to about 90% by weight polymer, and from about 10% to about 70% asphalt. Preferably, such pellets contain from about 40% to about 80% polymer. More preferably, such pellets comprise from about 20% to about 60% asphalt, from about 40% to about 80% polypropylene.

Suitable pellets may be formed by co-extruding the asphalt and polymer through a heated extruder wherein the materials are heated above their softening points and blended together, such as occurs in conventional extruders, and then forming the moldable mixture into pellets. Accordingly, the polymers used for providing the skim and the asphalts preferably have melting points and viscosities that are suitable for coextrusion. Preferred asphalts generally have a ring and ball softening point higher than about 90° C. measured according to ASTM D36. It is not necessary that the asphalt component of the pellets be the same as the packaged asphalt. Suitable asphalts include air-blown roofing flux and air-blown paving-grade asphalt in the range of from AC-2 to AC-50, more preferably AC-10 or AC-20.

Optionally, non-polymeric chemical modifiers and additives, such as a synthetic wax, may be added to the pellet composition. This feature advantageously permits the use of one or a few standard asphalts to fill the containers, with the desired chemical additives for optimizing the asphalt for the intended application being added to the asphalt via the pellets.

Additionally, one or more filler materials, such as crushed stone, glass fibers, talc, calcium carbonate, or silica, may be added to the pellet formulation if desired. However, such filler materials would be undesirable in some end uses of the packaged asphalt and are not generally preferred. Accordingly, it is to be understood that the filler materials are to be ignored when calculating the percentages of other specified materials in the asphalt; thus, the weight percentages of ingredients given herein are based on total weights of the materials or compositions exclusive of any filler or the like present in the material or composition.

The asphalt/polymer pellets may be of any conveniently formed size and geometric configuration that will exhibit suitable melting and/or dissolution rates. Generally, the rate of melting and dissolution increases as the ratio of surface area to mass increases. Consequently, to obtain the maximum benefit from the polymer, it may be preferred to maximize the mass of the pellet and minimize the surface area to slow the rate of dissolution of the polymer into the molten asphalt. Further, pellets having a size and shape that exhibit good flowability can be advantageous in automated processing equipment. For these reasons, spherical pellets having a diameter of from about 1.59 mm (¹⁄₁₆ inch) to about 6.35 mm (¼ inch), and cylindrical pellets having a comparable diameter and length of from about 1.59 mm (¹⁄₁₆ inch) to about 12.70 mm (½ inch) are generally preferred.

In addition to reducing fuming in the melting kettle, the incorporation of the polymer and asphalt pellets into the formed asphalt packages may also reduce the fumes emanating from the packages during cooling. As the pellets contact the hot molten asphalt being introduced into the packages, the pellets begin to melt and, because of their lower density, float to the top of the package where they form a film that reduces fuming as the packages cool. This beneficial attribute may be enhanced by including a small percentage of a polymer with a high melt flow index or that is highly soluble in asphalt. For example, formulations including 60% asphalt and a combination of 38% polypropylene and 2% EVA; or 37% polypropylene having a melt flow index of from about 5 to about 50 grams/10 minutes and 3% polypropylene having a melt flow index of from about 50 to about 400 grams/10 minutes (measured at 230° C. under a 21.60 g. load), may ensure that a sufficient amount of polymer is melted during package filling to form the desired film.

The polymeric material is typically added to the asphalt in an amount sufficient to reduce the visual opacity of the fumes by at least about 25% with respect to the same asphalt without the polymer. The visual opacity of the fumes is a measure of the blockage of natural light by the fumes. The more fumes emitted from the kettle, the higher the visual opacity. Conversely, a reduction in the visual opacity indicates a reduction in the amount of fumes emitted from the kettle. Preferably, the polymer is added in an amount sufficient to reduce the visual opacity of the fumes by at least about 35%, more preferably at least about 50–60%, and even more preferably at least about 70–80%.

The reduction in visual opacity of the fumes increases at higher temperatures where fuming is at its worst with conventional asphalt products. Kettles of roofing asphalt are typically heated to temperatures of from about 232° C. to about 288° C. Preferably the added polymer reduces the visual opacity of the fumes by at least about 35% at 260° C., and more preferably at least about 50% at 260° C.

Further, the total emissions of benzene soluble suspended particulates is typically reduced by at least about 15% over the same asphalt without the polymer. Preferably the total is reduced by at least about 25%, more preferably at least about 40–50%, and even more preferably at least about 60–70%. The total benzene soluble suspended particulate emissions is made up of the small particles of benzene soluble solid materials present in the fumes, so that a reduction in such particulate emissions indicates a reduction in the amount of fumes emitted. Preferably the total suspended particulates emissions is reduced by at least about 25% at 260° C., and more preferably at least about 50% at 260° C.

To provide a sufficient polymer skim to achieve such reductions in fuming the concentration of polymer is preferably sufficient to form a skin over the entire exposed surface of the asphalt in the kettle. Preferably, the amount of polymer or composite pellets present in each asphalt package is sufficient to provide a total polymer content of from about 0.2% to about 6.0% by weight based on the total weight of the asphalt and polymer in the package. More preferably, from about 0.2% to about 2.0%, and even more preferably, from about 0.3% to about 0.5% polymer is added based on the total weight of asphalt and polymer. At such levels, the amount of fumes normally emitted from a kettle of the molten asphalt is significantly reduced without any significant modification of the asphalt properties.

The composite pellets may be introduced into the molten asphalt charged to the packages in any manner that assures that the surface of the pellets is substantially coated with molten asphalt prior to its solidification. Preferably, the pellets are introduced into the packages simultaneously with a stream of molten asphalt as the packages are being filled. A particularly preferred apparatus for accomplishing this is depicted in FIG. 1, and comprises a means for introducing a specified quantity of pellets into the package, and a means for timing their introduction concurrent with the flow of molten asphalt into the package such that essentially the entire volume of pellets are introduced into the package while the asphalt is flowing into the container during its filling cycle.

A particularly suitable means for introducing the pellets comprises a reciprocating volumetric measuring device 10 in flow communication with a hopper or bulk storage bin 20 containing the pellets at one end of its reciprocal movement, and in flow communication with a discharge passage at the other end of its movement. Such device may be formed of a generally horizontal sleeve 12 having a reciprocating piston 14 slidably mounted therein and attached to a reciprocating drive means 16, preferably a pneumatic cylinder. The piston is shaped so as to conform to the cross section of the sleeve, and has a generally vertical bore or cavity of specified volume 18 formed therein which passes completely through the piston from top to bottom. The sleeve has an opening in the top 22 that is in flow communication with the bulk storage bin 20, and which is directly above the cavity in the piston when it is at one end of its reciprocal movement. Additionally, the sleeve has an opening in the bottom 24 that is also in alignment with the path of the piston cavity but at a sufficient lateral spacing from the top opening that there is no vertical overlap between the two openings. Accordingly, the openings in the sleeve are in alignment with the path of the open cavity in the piston during reciprocation of the piston such that each opening is alternately in flow communication with the cavity chamber as the piston oscillates within the sleeve. The bottom opening 24 is in flow communication with the asphalt package 28, preferably via a pipe or tube 30.

In operation, activation of pneumatic cylinder 16 causes piston 14 to reciprocate within sleeve 12 between top opening 22 and bottom opening 24. As the cavity in the piston comes into registry with the top opening, it fills with pellets from bulk storage bin 20. Upon the opening of valve 36 in package fill tube 26, the flow of molten asphalt into package 28 is initiated. Thereafter, activation of pneumatic cylinder 16 causes the piston to move toward bottom opening 24. When the cavity in the piston comes into alignment with bottom opening 24, the pellets flow from the cavity through the opening into tube 30 and are introduced into the asphalt in package 28, while asphalt is being introduced into the package via fill tube 26. To ensure that the pellets are discharged from the sleeve and enter the asphalt package quickly enough that substantially the entire volume of pellets enter the package, and are thus coated with asphalt, prior to the package being filled, an air inlet 32 connected to a source of compressed air 34 is preferably located in the top of the sleeve above the bottom opening. As the cavity in the piston comes into registry with the bottom opening, a blast of compressed air through the air inlet imparts sufficient pressure to move the pellets through tube 30 and ensure that the discharged pellets enter the asphalt package.

While the operation of the apparatus may be controlled manually, automated controls are generally preferred. Preferably, the activation of pneumatic cylinder 16 is controlled by a pressure sensor or other suitable flow detector, 38 in package fill tube 26. When flow is initiated in package fill tube 26, a signal sent from pressure sensor 38 activates pneumatic cylinder 16 and drives piston 14 in the direction of arrow A to the discharge position. Suitable flow detectors are well known to those skilled in the art, and include a pressure sensor that detects the drop in pressure in the fill tube that occurs when the filling of a package commences. After the piston reaches the discharge position, a signal from a suitable time (now shown) may be sent to a control valve 40 to initiate the flow of compressed air to blow the pellets through the discharge tube. Discontinuance of the air flow and retraction of the cylinder may similarly be controlled by a suitable timer. Preferably, the flow of pellets into the asphalt is completed before the asphalt gets to the container top to avoid splashing asphalt out of the container. More preferably, pellet flow is completed by the time the asphalt has filled about one-half of the container.

In an alternative embodiment, the pellets may be introduced into the package fill tube through a suitable inlet port such that they are added to the molten asphalt before it flows into the package.

The invention will now be further illustrated by reference to the following examples.

EXAMPLE 1

Testing was conducted to measure the ability of a minor amount of asphalt/polymer composite pellets incorporated in a conventionally packaged asphalt product to reduce fuming from a kettle of the molten asphalt during remelting. In this test, fuming of a standard BURA Type III asphalt (Amoco roofer's flux asphalt air-blown to a softening point of from about 85° C. (185° F.) to about 96.1° C. (205° F.), packaged in a conventional paper and metal container, was tested both with the added composite pellets ("low-fuming product"), and without the added polymer-containing pellets ("standard product").

The pellets added to the low-fuming product were prepared by pelletizing a mixture of asphalt air-blown to a softening point of about 143° C. (290° F.), polypropylene (Montel 6301 or Solvay Fortilene 12 melt flow index homopolymer), and ethylene-vinylacetate copolymer (Elvax 450) in a single screw extruder at a ratio of 60:30:10 by weight.

The equipment used for the testing included a 625-liter roofer's kettle heated by a propane burner. In the testing, the low-fuming product and the standard product were separately added to the kettle and melted to fill the kettle. The products were each tested at temperatures of 260° C. and 288° C. (500° F. and 550° F.), and the low-fuming products were tested at polymer concentrations ranging from 0.16 to 0.96 percent by weight of the total asphalt and polymer in the composition. To simulate actual usage conditions, 75.7 liters of molten product were drained from the kettle every 20 minutes and replaced by additional product added to the kettle. The testing was conducted outdoors, with the area around the kettle being surrounded to block the wind. The fumes emitted from the kettle were measured for visual opacity, and total suspended benzene soluble particulates as described below.

The test for visual opacity was performed in accordance with 40 C.F.R., Part 60, Appendix A, EPA Method 9, entitled "Visual Determination of the Opacity of Emission from Stationary Sources." A certified reader of opacity recorded the visual opacity every 15 seconds for two hours. The reader observed the fumes from the kettle and determined a percent opacity or blockage of the natural light. A low opacity indicates very little fumes, whereas a high opacity indicates a lot of fumes coming off the kettle. The results of the visual opacity readings are shown below in Table I, where the percent opacity is the average over the two-hour test:

TABLE 1

| Weight % Polymer | Temperature (° C.) | Opacity (%) |
|---|---|---|
| 0 (standard) | 260 | 18 |
| 0 (standard) | 288 | 19.5 |
| 0.16 | 260 | 16.6 |
| 0.16 | 288 | 26.9 |
| 0.32 | 260 | 11.4 |
| 0.32 | 288 | 16.9 |
| 0.64 | 260 | 10.1 |
| 0.64 | 288 | 9.4 |
| 0.96 | 260 | 5.1 |
| 0.96 | 288 | 5.3 |

The results of the visual opacity readings show that the low-fuming product had visibly lower fuming from the kettle than the standard product at polymer concentrations of 0.32 weight percent and above. Further, it was observed that at polymer loadings of 0.32 percent and above, the polymer of the low-fuming product formed a skim on substantially the entire upper surface of the molten asphalt.

The test for total benzene soluble suspended particulates was performed in accordance with the "Standard Operating Procedure: Benzene Solubles Method for Asphalt Institute Round Robin Study" which is a modified version of National Institute of Occupational Safety and Health (NIOSH) method 5023, 3rd edition. Two high-volume (Hi-Vol) TSP (total suspended particulates) samplers were elevated to position the sample inlets slightly above the kettle rim near the kettle opening. Each of the samplers pulled a stream of fumes from the kettle through a pre-weighed 1 ft$^2$ filter. Each sampler was operated for 2 hours. Thereafter, the filter elements were removed, covered with benzene (HPLC grade with evaporation residue of no greater than 0.0005%) and left for at least one hour. The benzene extract was then filtered in a Millipore Miliflex SR disposable filter under nitrogen pressure (approximately 7–10 psi). The benzene was then concentrated in a heater block at 85° C., transferred to pre-weighed cups, and placed in a vacuum oven at ambient temperature and 20–25 mm Hg vacuum overnight. The cups were then weighed to determine the amount of benzene soluble particulates. The results of the total benzene soluble suspended particulates measurements are shown below in Table II. The measurements are given in micrograms of particulates per standard cubic meter (scm) of fumes at standard conditions of one atmosphere pressure and 20° C.

TABLE II

Total Benzene Soluble Suspended Particles

| Weight % Polymer | Temperature (° C.) | Benzene Soluble Particulates µg/SCM | |
|---|---|---|---|
| | | Sampler 1 | Sampler 2 |
| 0 (standard) | 206 | 943 | 1626 |
| 0 (standard) | 288 | 2463 | 3284 |
| 0.16 | 260 | 599 | 1663 |
| 0.16 | 288 | 3139 | 5187 |
| 0.32 | 260 | — | — |
| 0.32 | 288 | — | — |
| 0.64 | 260 | 304 | 615 |
| 0.64 | 288 | 236 | 1465 |
| 0.96 | 260 | 443 | 553 |
| 0.96 | 288 | 301 | 1530 |

These results, like the visual opacity results, show that the low-fuming product reduced the amount of fumes from the kettle compared to the standard product. The benzene soluble particulates were consistently lower for the low-fuming product versus the standard product at polymer levels greater than 0.32%.

EXAMPLE 2

The benzene soluble particulates emitted were measured for 16 additional samples of standard product and low fuming product having 0.32 weight percent polymer. The results are shown below in Table III.

TABLE III

Total Benzene Soluble Suspended Particulates

| Weight % Polymer | Temperature | Benzene Soluble Particulates (µg/SCM) |
|---|---|---|
| 0 | 260 | 2377 |
| 0 | 260 | 3306 |
| 0 | 260 | 1861 |
| 0 | 260 | 2132 |
| 0 | 260 | 2519 |
| 0 | 260 | 1652 |
| 0 | 260 | 5833 |
| 0 | 260 | 2702 |
| 0 | 288 | 3292 |
| 0 | 288 | 3756 |
| 0 | 288 | 5633 |
| 0 | 288 | 3507 |
| 0 | 288 | 5809 |
| 0 | 288 | 4103 |
| 0 | 288 | 18854 |
| 0 | 288 | 12808 |
| 0.32 | 260 | 768 |
| 0.32 | 260 | 687 |
| 0.32 | 260 | 38 |
| 0.32 | 260 | 535 |
| 0.32 | 260 | 116 |
| 0.32 | 260 | 129 |
| 0.32 | 260 | 106 |
| 0.32 | 260 | 194 |
| 0.32 | 288 | 415 |
| 0.32 | 288 | 636 |
| 0.32 | 288 | 387 |
| 0.32 | 288 | 522 |
| 0.32 | 288 | 165 |
| 0.32 | 288 | 429 |
| 0.32 | 288 | 118 |
| 0.32 | 288 | 485 |

These results show that the benzene soluble particulates are also lower at 0.32% polymer than for the standard product.

Although the invention has been described in detail in reference to preferred feature and embodiments, appropriate modifications will be apparent to the artisan. Thus, the invention is intended not to be limited by the foregoing description, but to be defined by the appended claims and their equivalents.

What is claimed is:

1. An asphalt composition comprising a block of solidified asphalt having dispersed therein one or more pellets; said pellets comprising a polymeric material that melts and forms a skim on the upper surface of the composition when it is melted.

2. An asphalt composition as recited in claim 1, wherein said composition comprises from about 0.2% to about 6% by weight of the polymeric material.

3. An asphalt composition as recited in claim 1, wherein said composite pellets comprise from about 30% to about 90% by weight polymeric material and from about 10% to about 70% by weight asphalt.

4. An composition as recited in claim 1, wherein said polymeric materials are selected from the group consisting of polypropylene, ethylene-propylene copolymers, ethylene-vinylacetate copolymers, synthetic rubbers, ethylene-methylacrylate copolymers and mixtures thereof.

5. An asphalt composition as recited in claim 3, wherein said composite pellets comprise from about 40% to about 80% by weight polypropylene, and from about 20% to about 60% by weight asphalt.

6. An asphalt composition as recited in claim 1, wherein said composite pellets further comprise a synthetic wax.

7. A low-fuming meltable asphalt composition as recited in claim 1, wherein said composite pellets are cylindrical and have a diameter of from about 1.5 mm to about 6.3 mm and a length of from about 1.6 mm to about 12.7 mm.

8. An asphalt composition as recited in claim 1, wherein the amount of the polymeric material is sufficient to cause a reduced emission of benzene soluble suspended particulates from the composition.

9. An asphalt composition as recited in claim 1, wherein the polymeric material has a melt flow index of from about 15 to about 95 grams/10 minutes at 190° C. under a 2.16 kg load.

10. An asphalt composition comprising a block of solidified asphalt having dispersed therein one or more pellets; said pellets comprising a polymeric material that melts and forms a skim on the upper surface of the composition when it is melted; said polymeric material comprising a blend of:

a) at least a first polymer; and b) at least a second polymer having a higher melt flow index than said first polymer.

11. An asphalt composition according to claim 9, wherein the polymeric material comprises from about 0.2% to about 6% by weight of the composition.

12. An asphalt composition as recited in claim 11, wherein at least one of the first or second polymers has a melt flow index of from about 15 to about 95 grams/10 minutes at 190° C. under a 2.16 kg load.

13. An asphalt composition according to claim 9, wherein the first polymer is polypropylene and the second polymer is ethylene vinyl acetate.

* * * * *

UNITED STATES PATENT AND TRADEMARK OFFICE
CERTIFICATE OF CORRECTION

PATENT NO. : 6,069,194
DATED : May 30, 2000
INVENTOR(S) : Michael R. Franzen et al.

It is certified that error appears in the above-identified patent and that said Letters Patent is hereby corrected as shown below:

Title page,
Inventors: Thomas C. Bitsky and Ron S. Bliss should be deleted.

Signed and Sealed this

Eleventh Day of December, 2001

Attest:

*Attesting Officer*

NICHOLAS P. GODICI
*Acting Director of the United States Patent and Trademark Office*